United States Patent
Nakaoka et al.

(10) Patent No.: US 7,484,211 B2
(45) Date of Patent: Jan. 27, 2009

(54) REMOTE PRINTING SYSTEM

(75) Inventors: Yasushi Nakaoka, Nagano-ken (JP); Masanori Mukaiyama, Nagano-ken (JP); Satoshi Miyazawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 10/487,312

(22) PCT Filed: Oct. 31, 2002

(86) PCT No.: PCT/JP02/11410

§ 371 (c)(1),
(2), (4) Date: Feb. 20, 2004

(87) PCT Pub. No.: WO03/042809

PCT Pub. Date: May 22, 2003

(65) Prior Publication Data

US 2004/0201860 A1    Oct. 14, 2004

(30) Foreign Application Priority Data

Nov. 13, 2001  (JP)  ............................. 2001-347731

(51) Int. Cl.
*G06F 9/46* (2006.01)
*G06F 7/00* (2006.01)
(52) U.S. Cl. ........................ 718/100; 707/10
(58) Field of Classification Search ................ 718/100, 718/101; 399/80, 81, 82; 707/10
See application file for complete search history.

(56) References Cited

U.S. PATENT DOCUMENTS

| | | | | |
|---|---|---|---|---|
| 2001/0034747 | A1* | 10/2001 | Fujitani et al. | 707/525 |
| 2001/0034774 | A1  | 10/2001 | Watanabe et al. | |
| 2001/0055492 | A1* | 12/2001 | Wood et al. | 399/8 |
| 2002/0093673 | A1* | 7/2002  | Safra et al. | 358/1.15 |
| 2002/0136559 | A1* | 9/2002  | Simpson et al. | 399/9 |
| 2003/0069915 | A1* | 4/2003  | Clough et al. | 709/100 |
| 2003/0079134 | A1* | 4/2003  | Manchala et al. | 713/182 |
| 2003/0093490 | A1* | 5/2003  | Yamamoto et al. | 709/213 |

FOREIGN PATENT DOCUMENTS

JP    2000-259518    9/2000

(Continued)

OTHER PUBLICATIONS

Abstract of Japanese Patent Publication 2001-236183, Pub. Date: Aug. 31, 2001, Patent Abstracts of Japan.

(Continued)

*Primary Examiner*—Meng-Ai An
*Assistant Examiner*—Camquy Truong
(74) *Attorney, Agent, or Firm*—Martine Penilla & Gencarella, LLP

(57) ABSTRACT

The technique of the invention attains a practical printing system between arbitrary clients and printers connecting with a network.

An intermediation server connecting with the network is interposed between the clients and the printers to intermediate printing. Each client sends a printing request, which includes selection of print data and specification of a printer as an output destination, to the intermediation server. The intermediation server converts the selected print data into a general purpose format, which does not depend upon the type of the printer, and transfers the converted print data to the specified printer.

13 Claims, 8 Drawing Sheets

FOREIGN PATENT DOCUMENTS

| | | |
|---|---|---|
| JP | 2000-357198 | 12/2000 |
| JP | 2001-236183 | 8/2001 |
| JP | 2001-236271 | 8/2001 |
| JP | 2001-312378 | 11/2001 |
| JP | 2002-169671 | 6/2002 |

OTHER PUBLICATIONS

Abstract of Japanese Patent Publication 2001-236271, Pub. Date: Aug. 31, 2001, Patent Abstracts of Japan.

Abstract of Japanese Patent Publication 2002-169671 Pub. Date: Jun. 14, 2002, Patent Abstracts of Japan.

Abstract of Japanese Patent Publication 2000-259518, Pub. Date: Sep. 22, 2000, Patent Abstracts of Japan.

Abstract of Japanese Patent Publication 2000-357198, Pub. Date: Dec. 26, 2000, Patent Abstracts of Japan.

Abstract of Japanese Patent Publication 2001-312378 Pub. Date: Nov. 9, 2001, Patent Abstracts of Japan.

* cited by examiner

REMOTE PRINTING SYSTEM

TECHNICAL FIELD

The present invention relates to a technique of outputting video and audio data via a network.

BACKGROUND ART

Various printers have been used as an output device of computers. A printer is one-to-one connected with a computer (hereafter expressed as 'locally connected') by means of a preset cable, such as a two-way parallel interface, and receives data from the computer to execute printing. With the penetration of LANs (local area networks), it becomes popular that multiple computers connecting with a network share one or multiple printers connecting with the network.

Another proposed technique utilizes a protocol called IPP (Internet Printing Protocol) to allow for printing among arbitrary clients and printing devices connected to the Internet. The output destination of printing is, however, limited to printing devices having known URIs (Uniform Resource Indicators). Namely simple application of only the IPP does not attain a highly convenient printing system that can freely select the output destination on the network.

In any of the prior art printing systems, the connection state of the printer with the computer is generally set in advance. Namely the location of printing is typically fixed for each owner of the computer.

The recent advancement of the information infrastructure, such as the Internet, and the improved portability of terminals like laptops and cellular phones, which are used to access the information infrastructure, allow for access to information at any locations. Under such circumstances, development of the new technique has been highly demanded, which enables the user to freely select an output destination for printing on a network. For example, one requirement is to utilize a nearest printing device for printing immediately after acquisition of information. It is also desired that print jobs are readily executable from personal digital assistances and other portable terminals.

There are two important issues on printing via the network.

The first issue regards specification of an output destination for printing. There are a large number of available output destinations for printing on the network. One applicable method gives a client a list of available output destinations and requests the client to select a desired output destination from the list. This method, however, requires relatively troublesome operations and significantly lowers the convenience. Another applicable method retrieves an appropriate printing device. This method also requires input of retrieval conditions and other relatively troublesome operations. Such complicated operations are not negligible in the case of executing print jobs from portable terminals.

The second issue regards a print timing. At the time of output of a print job, the user may not be geographically close to a printing device connecting with the network. The printing device specified as the output destination may not be kept in a printable status. Print jobs are to be executed in the state that allows the user to receive resulting prints. The issue of the print timing is especially important when a certain user transmits a print job to another user by utilizing a printing system via a network, that is, in the case where the printing system via the network is used as the substitute of facsimile.

These problems are not restricted to the printing system, but are commonly found in systems of outputting video data, document data, and audio data via a network.

DISCLOSURE OF THE INVENTION

The object of the invention is thus to provide a technique of easily specifying an output destination in the process of outputting an image or other data via a network. The object of the invention is also to provide a technique of effectuating an output at a user's desired timing.

In order to attain at least part of the above objects, the present invention is directed to a system including at least an intermediation server and an output device, which are connected with each other on a network. The network may be a wide area network like the Internet or may alternatively be a relatively limited network like a LAN (Local Area Network). The intermediation server receives jobs for outputting a variety of data, such as video data, document data, and audio data, via the network and manages the received jobs grouped by respective users. The user may be identical with or different from the sender of each job. The intermediation server receives an output instruction with regard to corresponding jobs, which are mapped to a specific user, among the jobs under management and transfers at least part of the corresponding jobs to the output device in response to the output instruction. Typical examples of the output device include printing devices that print image data, display devices that display video data, such as projectors and displays, and audio equipment that output audio data. The output device executes output of the transferred jobs. The system of the invention outputs selected jobs in response to the output instruction. This arrangement ensures output of jobs by the user's desired output device at the user's desired timing, thus enhancing the convenience of output via the network.

The sender of the output instruction is some client connecting with the network (hereafter referred to as the output instruction device). The intermediation server of the invention receives the output instruction and gives a list of jobs corresponding to the output instruction to the output instruction device. The output instruction device then selects transferred jobs, which are to be transferred, from the list. This arrangement ensures relatively easy specification of transferred jobs.

In the case where multiple output devices are located on the network, specification of a desired output device as the transfer destination is required. A diversity of techniques may be applied for such specification.

In a first application, each job may be mapped to an output device in advance. This arrangement enables the sender of the job to specify a desired output device.

In a second application, the output device may give an output instruction, and jobs corresponding to the output instruction may be transferred to the sender of the output instruction. This arrangement facilitates specification of a desired output device and effectively prevents erroneous specification of an undesired output device.

In a third application, the output instruction may include transfer destination information that is used to identify a transfer destination of the corresponding jobs. This arrangement ensures flexible selection of a desired output device, which may be identical with or different from the output instruction device. In the case where the output instruction includes the transfer destination information, a preferable procedure determines whether the specified user has right to use an output device identified by the transfer destination information and effectuates the transfer when the right of the specified user is authenticated. This procedure effectively prevents unauthorized use of the output device.

The intermediation server of the invention may notify the user of receipt of transferred jobs. When the sender of each job is different from the user, such notice enables the user to be informed of receipt of the job. This arrangement effectively prevents any job from being left in an unprocessed and non-output state for a long time. A diversity of techniques, for example, e-mail, may be applicable for such notification. Push-type notification means typically used on cellular phones is especially preferable for the enhanced convenience. One preferable arrangement enables the user to arbitrarily register information on a destination of the notification, for example, an e-mail address, in advance in the intermediation server.

The intermediation server of the invention may have an additional function of enabling the sender of each job to check for the output result of the job. For example, the intermediation server manages sender information, which is used to identify the sender of each job and has been mapped to the job. The sender information may be a user ID of the sender or information essential for use of the network, such as an MAC address or an IP address of the client operated by the sender. The intermediation server receives a verification request of an output result of each job, together with the sender information, from one of clients connecting with the network, extracts one or multiple jobs mapped to the sender information in response to the verification request, and presents a result of the extraction to the client. The sender of each job can thus verify that the job has been output successfully to the output device. This application is especially effective when the sender of a job is different from the receiver of the job. With regard to a job of uncompleted output, the intermediation server may send an output reminder to the user who is the receiver of the job, in response to the job sender's instruction.

The intermediation server manages at least jobs of uncompleted output. The information given to the sender thus includes at least jobs of uncompleted output. In one preferable application, the intermediation server manages at least identification information on each job of completed output, which is mapped to the sender information, and presents a result of extraction including jobs of completed output. The sender of the job can thus verify that each job has not been deleted but has been output successfully. In order to save the memory capacity of the intermediation server, the substantive data of the jobs of completed output may be deleted. The identification information on the jobs of completed output may be deleted in response to the sender's instruction or may automatically be deleted after elapse of a preset time since completion of output.

The technique of the present invention is not restricted to the intermediation server discussed above, but may also be constructed as an output instruction device that transmits an instruction to the intermediation server. The output instruction device functions to transmit identification information, which is used to identify a user, to the intermediation server and to select jobs to be transferred. The output instruction device may be identical with the output device or may be constructed as a separate body from both of the intermediation server and the output device. In the latter case, from the viewpoint of convenience, preferable examples of the output instruction device include cellular phones, PDAs, and other portable terminals having functions of access to the network.

The present invention is also directed to a diversity of other applications. Such applications include an intermediation method that utilizes the intermediation server to mediate jobs to an output device, a computer program that causes the intermediation server to attain its functions, and a recording medium in which such a computer program is recorded.

Other possible applications of the invention correspond to the output instruction device and include an output instruction method that gives an output instruction to the intermediation server, a computer program that causes the output instruction device to attain its functions, and a recording medium in which such a computer program is recorded. In one preferable arrangement, the computer program has a function of selecting transferred jobs, a function of specifying a transfer destination, and a function of effectuating transfer without requiring a user's operations, in addition to a function of giving an output instruction.

Typical examples of the recording medium include flexible disks, CD-ROMs, DVDs, magneto-optic discs, IC cards, ROM cartridges, punched cards, prints with barcodes or other codes printed thereon, internal storage devices (memories like RAMs and ROMs) and external storage devices of computers, and a variety of other computer readable media.

BEST MODES OF CARRYING OUT THE INVENTION

Printing systems via a network are discussed below as preferred embodiments of the present invention.
A. First Embodiment
A1. General Structure of System
A2. Output Process
A3. Verification Process
B. Second Embodiment
B1. General Structure of System
B2. Output Process

A. FIRST EMBODIMENT

A1. General Structure of System

Figure 1:
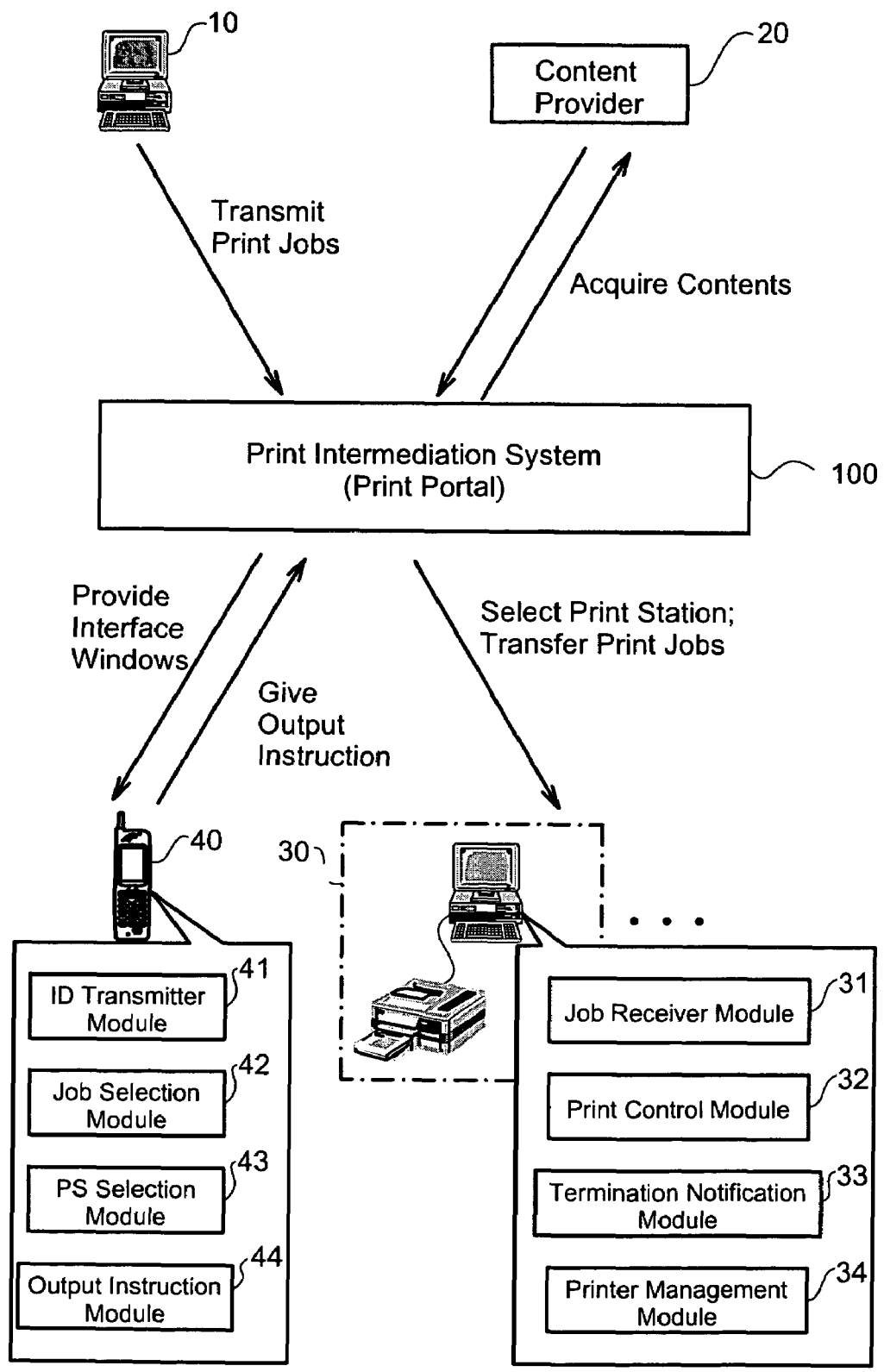
FIG. 1 schematically illustrates the construction of a printing system in one embodiment.

FIG. 1 schematically illustrates the construction of a printing system in one embodiment. This system includes a print intermediation system 100 as a core, which connects with respective clients by means of a network to attain printing via the network as discussed below. The print intermediation system 100 (hereafter referred to as the print portal) receives jobs transmitted from a job sender 10 and manages the received jobs. In response to a printing instruction transmitted from an instruction client 40 of a cellular phone, the print portal 100 transfers corresponding print jobs to a print station 30. The print station 30 receives the transferred print jobs and executes printing.

The Internet is applied for the network in the structure of this embodiment, although some restrictive network like a LAN or a personal computer communication may substitute for the Internet. As a matter of convenience, the following discussion is based on the application of the Internet for the network.

The job sender 10 is typically a general purpose computer having functions of access to the network. Objects to be printed include images and documents, which are created by the job sender 10 according to a diversity of application programs and Web pages provided by a variety of content providers 20 present on the Internet. In the case of printing each Web page, a content itself created in, for example, HTML may be transmitted as a print job, or a URL (uniform resource locator) of the Web page may alternatively be transmitted as a print job. In the latter case, for example, the print portal 100 acquires a content based on the URL and transfers the acquired content to the print station for execution of printing.

The instruction client 40 is a device to give an output instruction regarding each of the print jobs managed by the print portal 100. The instruction client 40 is a cellular phone having the functions of access to the Internet in the structure of this embodiment, although this example is not restrictive at all.

FIG. 1 also illustrates functional blocks of the instruction client 40. In the structure of this embodiment, these functional blocks are actualized by the software installed in the instruction client 40. These functional blocks may alternatively attained by the hardware construction.

An ID transmitter module 41 functions to transmit a user ID of each user who gives an instruction of outputting each print job (hereafter referred to as the indicator). The user ID may be replaced with a password. A job selection module 42 selects a print job to be output among the print jobs managed by the print portal 100. A PS selection module 43 specifies a print station, which the selected print job is to be transferred to. An output instruction module 44 gives an instruction of starting transfer of the selected print job. A series of interface windows required for such specification and instruction open on a display of the instruction client 40. It is simple and preferable that these windows are provided by the print portal and are browsed by means of a browser provided on the instruction client 40.

The print station 30 includes a computer connectable with the network and a printer locally connected to the computer. The print station 30 may alternatively be constructed by only a single printer that is connectable with the network. The print station 30 has functional blocks, which are also illustrated in the drawing, to allow for printing in this system. In the structure of this embodiment, these functional blocks are actualized by the software installed in the computer. In the case where the print station is constructed by a single printer, the respective functional blocks are provided in the printer. These functional blocks may alternatively be attained by the hardware construction.

A job receiver module 31 functions to receive each print job from the print portal 100. A print control module 32 functions to control the printer according to the received print job and thereby implement printing. A termination notification module 33 notifies the print portal 100 of termination of printing. It is preferable that the termination notice is given in the case of abnormal termination as well as in the case of normal termination of printing. A printer management module 34 functions to monitor whether the printer is in an executable state of normal printing. The printer management module 34 prohibits execution of printing when it is determined that there is some trouble or defect for normal printing, for example, in the case of a short supply of ink or toner to the printer, in the case of shut-down of the power supply to the printer, and in the case of a short supply of paper. One preferable application notifies the outside of the trouble or defect. The notification may select an appropriate method, for example, visual output to the display of the computer, audio output, or communication to the print portal 100. The termination notification module 33 and the printer management module 34 may be omitted from the functional blocks provided in the print station, if not required.

Figure 2:
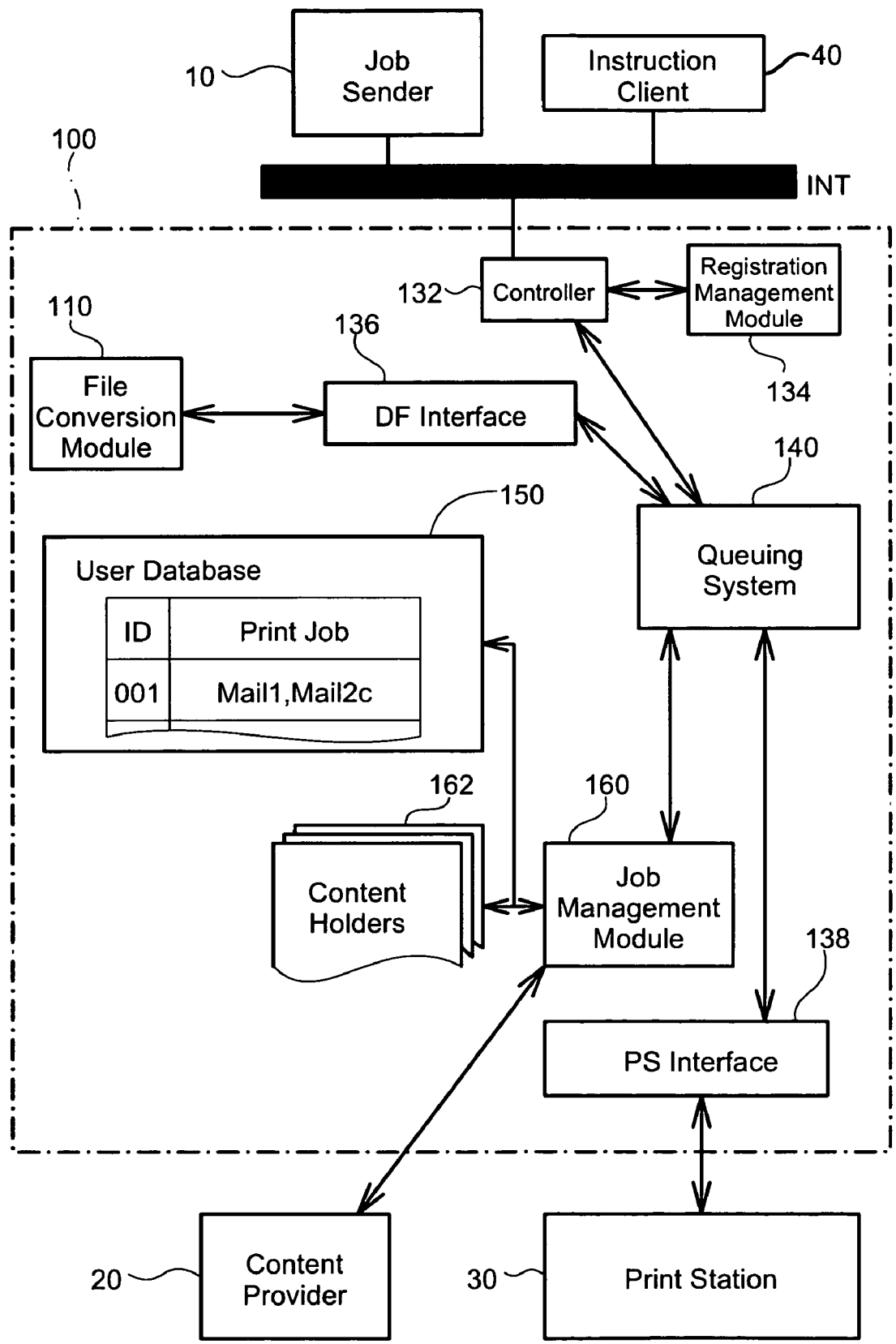
FIG. 2 shows the internal structure of a print portal 100.

FIG. 2 shows the internal structure of the print portal 100. Various functional blocks illustrated are actualized by the software in the print portal 100. These functional blocks may alternatively be attained by the hardware construction. For convenience of explanation, in the structure of this embodiment, the respective functional blocks are provided in a single server. One possible modification is a distributed processing system using multiple servers.

A controller 132 controls the operations of the respective functional blocks included in the print portal 100 and transmission of information to and from the outside via the Internet INT. The objects of control include registration and management of users, output instructions of print jobs, and retrieval of printers as output destinations. The controller 132 also provides a series of interface windows for data transmission between the print portal 100 and the outside.

A registration management module 134 registers and manages users who utilize the print portal 100, the content provider 20, and the print station 30. The registration management module 134 functions to create a series of interface windows for such registration and management, to store registration-related data into a predetermined database, and to modify the storage.

A queuing system 140 relays the operations of the respective functional blocks. In the structure of this embodiment, the respective blocks are actualized by the object-oriented software. Each functional block refers to a messages registered in the queuing system 140, detects the presence of a print job as an object of processing, and executes an allocated process. On completion of the processing, a message representing completion of the processing is registered in the queuing system 140. As the respective functional blocks execute the allocated processes via the queuing system 140 as the relay, the print portal 100 comprehensively implements a series of processing from receipt to output of each print job.

In order to attain the series of processing, the queuing system 140 has a job registration queue, a content acquisition queue, a file conversion queue, and a job transmission queue.

A job management module 160 mainly has two functions. The first function is to gain access to the content provider 20, for example, based on specification of a content to be printed by a URL, and to acquire the content specified by the user as an object of printing. The acquired content is temporarily held in one of content holders 162. In order to attain this function, the job management module 160 refers to the content acquisition queue provided in the queuing system 140 and carries out the required operation according to a message accumulated in the content acquisition queue.

The second function of the job management module 160 is to manage each print job until an output instruction is given with regard to the print job. The print portal 100 does not immediately transfer each received print job to the print station 30 but manages the print job until receipt of an output instruction with regard to the print job. The job management module 160 gains the job registration queue, which is created in response to receipt of a print job by the controller 132, from the queuing system 140 and registers the print job into a user database 150. One example of the user database is illustrated in the drawing. This illustrated example manages the print jobs grouped by the respective users, where each print job is mapped to the user ID of each job sender. The user database also stores information intrinsic to each user, for example, the right to use the print station 30, the access authority to the content provider 20, and the accounting system, although such information is omitted from the illustration. The output destination of each print job may be specified by the output instruction or may be set in advance.

The job management module 160 has a function of providing a list of print jobs managed in the user database 150, in addition to the print job registration function. Another function of the job management module 160 is creation of the file conversion queue and registration of the created file conversion queue into the queuing system 140 in response to an output instruction to carry out pre-treatment of a print job corresponding to the output instruction prior to output of the print job to the print station 30. The procedure of this embodiment starts transfer of each print job after receipt of a corresponding output instruction. It is, however, not necessary to handle all print jobs in this manner. One modified arrangement provides an option of immediate output at the time of transmission of each print job. In the case of selective activation of this option, the corresponding print job is transferred immediately without waiting for its output instruction.

A file conversion module 110 functions to convert each content into a PDF format. The PDF is a general purpose format. Conversion of print data into such a general purpose format advantageously ensures easy output to diverse printers and relatively accurate reproduction of desired layouts on resulting prints. Most print data including documents and images are convertible into this format, so that a wide range of contents are objects of printing. A page describing language, such as Postscript (registered trademark), may alternatively be used as the general purpose format.

A DF interface 136 transfers data to the file conversion module 110 according to a message accumulated in the file conversion queue of the queuing system 140. When receiving a processed PDF file from the file conversion module 110, the DF interface 136 registers a print job transmission message into the job transmission queue of the queuing system 140. One possible modification may omit the DF interfaced 136 and design the file conversion module 110 to access the queuing system 140. The procedure of this embodiment carries out file conversion after receiving an output instruction of each print job. One modified arrangement may carry out file conversion and register the converted print job into the user database 150 at the time of receiving each print job. In another modified arrangement, file conversion does not depend upon the receipt of a print job or an output instruction. This arrangement successively carries out file conversion of print jobs registered in the user database, while the server has a relatively light load.

A PS interface 138 functions to transmit each print job to the print station 30. The PS interface 138 transmits each print job to the specified print station 30 according to the message accumulated in the job transmission queue of the queuing system 140. The transmission is in conformity with any of diverse protocols set by the print station 30, for example, HTTP (Hypertext Transport Protocol).

A2. Output Process

Figure 3:
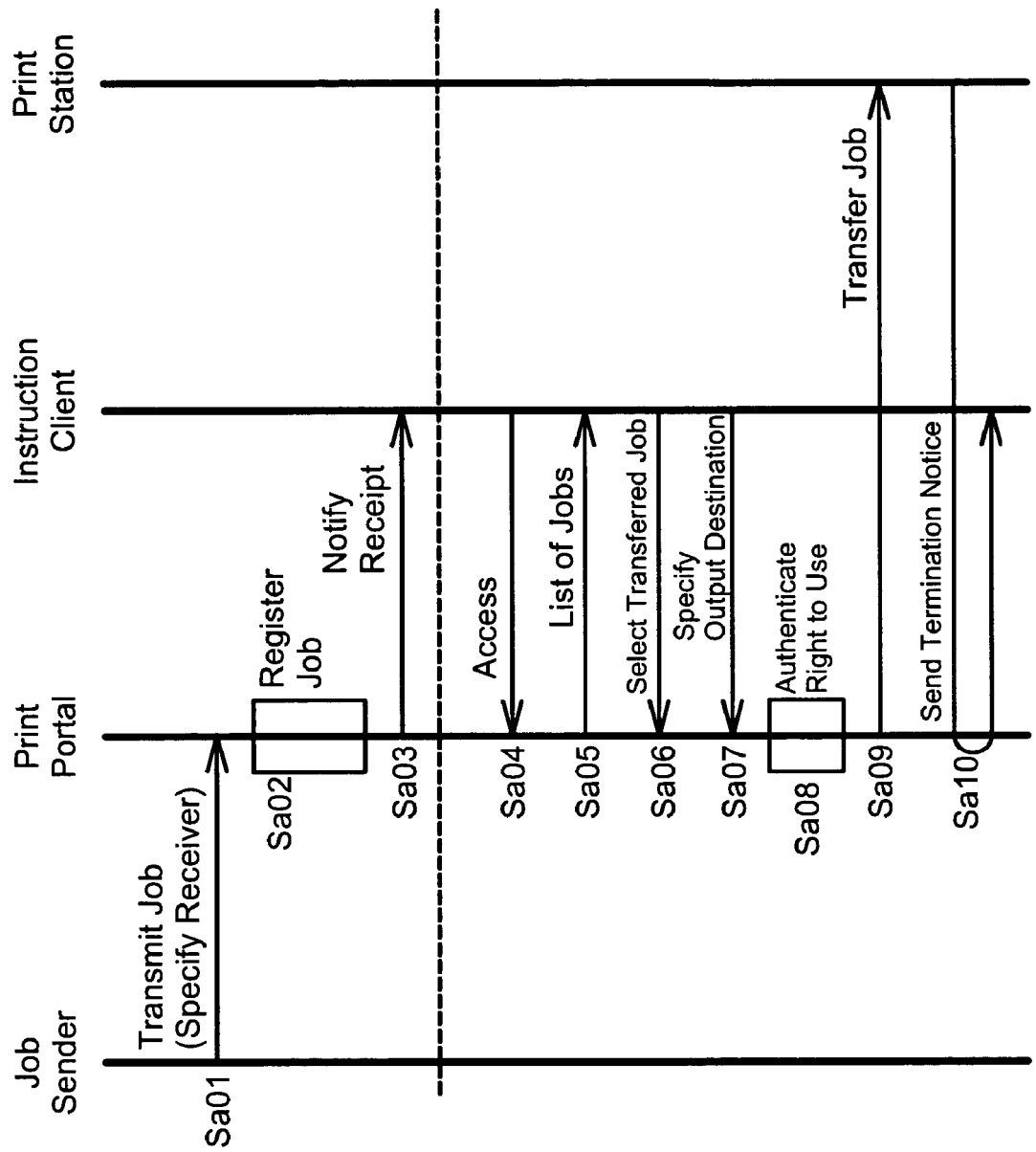
FIG. 3 is a flowchart showing an output process routine in the embodiment.

FIG. 3 is a flowchart showing an output process routine executed in this embodiment. The output process routine includes a series of processing executed by the job sender 10, the print portal 100, the instruction client 40, and the print station 30. The output process of this embodiment is mainly divided into two phases, a print job transmission phase and an output phase. The processing above a broken line in the flowchart corresponds to the print job transmission phase, whereas the processing below the broken line corresponds to the output phase.

In the transmission phase, a print job is transmitted from the job sender 10 to the print portal 100 (step Sa01). At this stage, information regarding the sender of the print job is transferred to the print portal 100. The transmitted print job includes specification of a receiver. The receiver is identified, for example, by the user ID. The sender and the receiver may be identical with each other or different from each other.

The print portal 100 registers the received print job (step SaO2). As discussed above with reference to FIG. 2, the received print job is mapped to the user ID for management. The print portal 100 also notifies the receiver of receipt of the print job (step Sa03). The procedure of this embodiment utilizes e-mail for the notification. The e-mail address of the receiver has been registered in the user database 150 (FIG. 2). Notification by e-mail enables the receiver to be immediately informed of receipt of the print job. The notification of the receipt (step Sa03) is not restricted to e-mail, but a diversity of other techniques, such as facsimile, may be applied for the notification. The notification step may be omitted, if not necessary.

The output phase has the following steps. The receiver manipulates the instruction client 40 to gain access to a Web page provided by the print portal 100 (step Sa04). At this moment, the receiver transmits the own user ID to the print portal 100.

The print portal 100 sends a list of print jobs mapped to the transmitted user ID for management to the instruction client 40 (step Sa05). The receiver selects a desired job to be printed (hereafter referred to as the transferred job) from the list (step Sa06) and specifies an output destination (step Sa07). The output destination may be specified by address information of the print station 30 or by a shop name or another name where the print station 30 is installed.

The print portal 100 then determines whether the receiver has the right to use the print station 30 specified by the receiver (step Sa08). Information used for such authentication, for example, the right to use the print station 30, has been stored in advance in the user database 150.

When the right to use the print station is authenticated, the print portal 100 transfers the selected print job to the specified print station (step Sa09). On completion of execution of the selected print job, the print station sends a termination notice to the print portal 100 (step Sa10). It is preferable that the termination notice is sent in the case of abnormal termination as well as in the case of normal termination of the print job. In the structure of this embodiment, the print portal 100 transfers the termination notice to the instruction client 40. This arrangement enables the receiver to be informed of termination of printing, even when the receiver is away from the print station 30. The termination notice may also be transferred to the job sender.

The structure of the embodiment allows the job sender to inquire the output status of each print job. The print portal 100 thus continuously keeps verification information on each print job, which is to be provided to an inquiry, for example, the name of the job sender, the document name of the job, and the address and the attribute of the job, even after completion of printing. The substantive contents of the print job may be eliminated.

Figure 4:
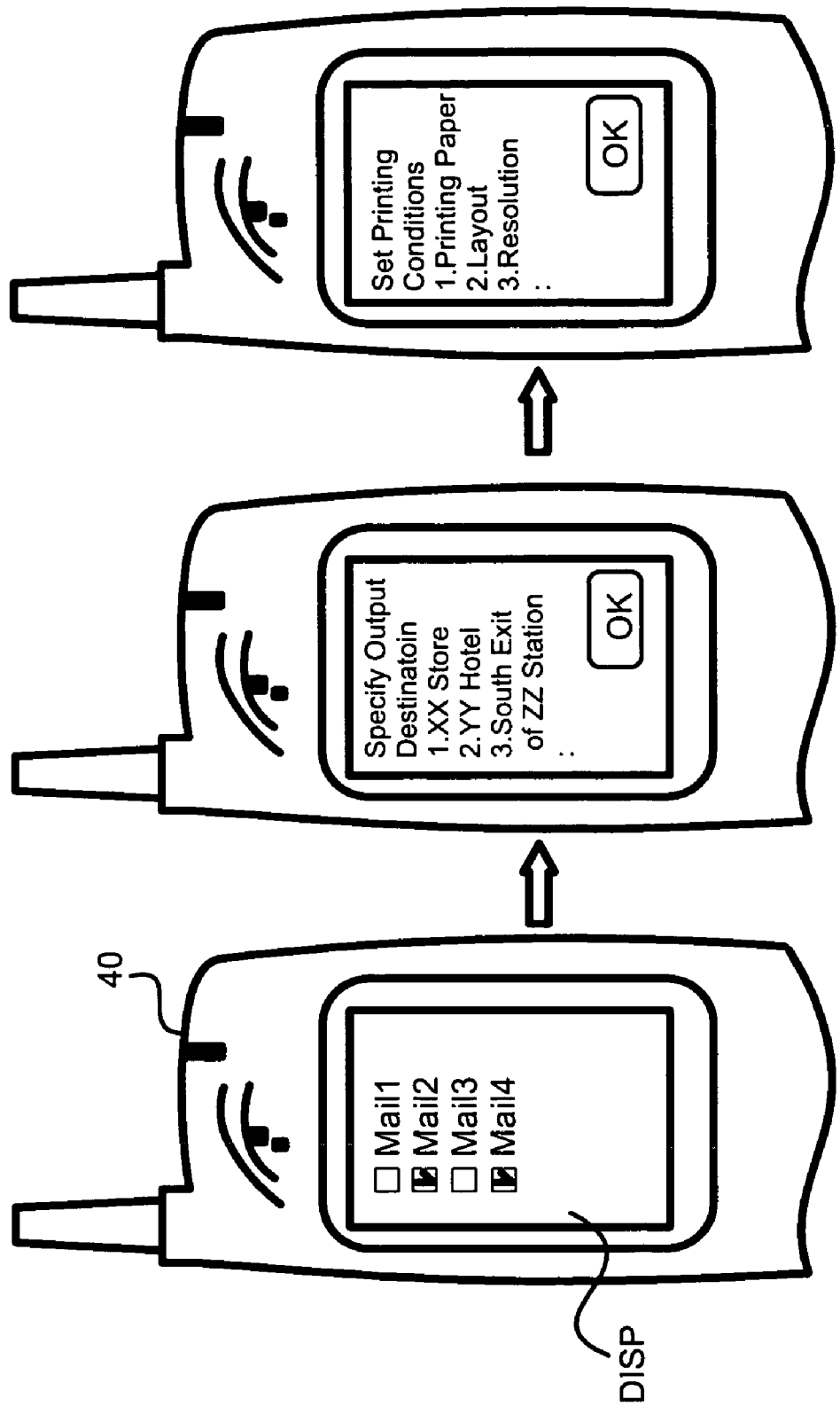
FIG. 4 shows a series of interface windows to give an output instruction.

FIG. 4 shows a series of interface windows to give an output instruction. These interface windows open on a display DISP of the instruction client 40. The left drawing shows a window including a list of print jobs. In the state of the display, four print jobs, Mail1 to Mail4, are received. The receiver ticks corresponding checkboxes to select Mail2 and Mail4 as transferred jobs. This illustrated example enumerates only titles of the print jobs. In one modified arrangement, the list may additionally include attribute information of the respective print jobs. The attribute information includes the sender, the time when the print job has been received, the paper size, the number of copies, and the specification of color or monochromatic.

The center drawing shows a window used to specify an output destination. In this illustrated example, the output destination is specified, for example, by the name of a shop or by the name of a hotel. One preferable application may show branch names after selection of 'XX Store' to allow for hierarchical selection of the details.

The right drawing shows a window used to set printing conditions. The receiver selects desired options, for example, a type of printing paper, a layout, and a resolution, from respective menus to specify settings. A setting like 'N-Up' printing, which allows multiple pages to be printed on one sheet of printing paper, may be specified for the layout. The receiver can thus obtain resulting prints according to the desired settings. The setting of the printing conditions may be omitted, if not necessary.

As described above, the printing system of the first embodiment enables the receiver to specify the timing of execution of each print job and its location. This arrangement enhances the convenience of printing via the network.

A3. Verification Process

Figure 5:
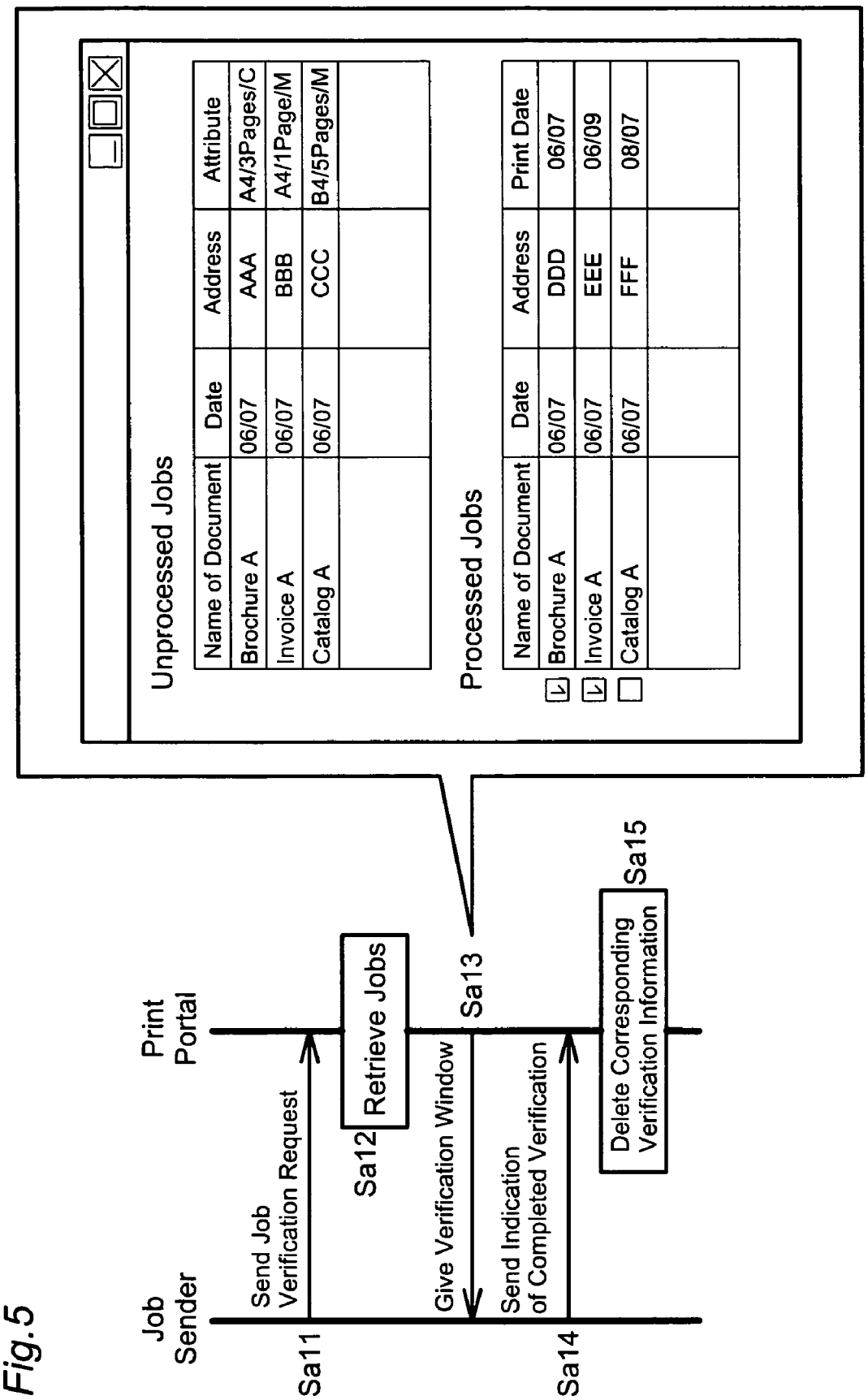
FIG. 5 is a flowchart showing a job output status verification routine.

FIG. 5 is a flowchart showing a job output status verification routine. The job sender verifies whether the print job sent by the sender has been printed successfully, according to this processing routine of the embodiment.

The job sender manipulates the client to send a job verification request to the print portal 100 (step Sa11). The job verification request includes a user ID of the job sender. The print portal 100 receives the job verification request and retrieves jobs corresponding to the user ID of the job sender from the user database 150 (step Sa12). The user database 150 stores instruction information with regard to both unprocessed print jobs, which have not yet been printed, and processed print jobs, which have been printed. The instruction information is mapped to the user ID of the job sender. The print portal 100 utilizes the user ID as a key and retrieves the user database 150 to readily extract print jobs mapped to the job sender. The print portal 100 gives a list of the extracted print jobs in the form of a verification window to the client (step Sa13).

The right drawing shows a verification window given to the client. In this illustrated example, a group of unprocessed print jobs and a group of processed print jobs are separately displayed. The window includes columns of verification information, that is, the document name, the transmission date, the address, and the attribute of each print job. A checkbox is attached to each processed print job. The job sender ticks the checkboxes of the respective processed print jobs to indicate completed verification.

When the job sender transmits an indication of completed verification to the print portal 100 (step Sa14), the print portal 100 deletes the verification information corresponding to the ticked print jobs from the user database 150 (step Sa15). The program then exits from this processing routine.

The procedure of this embodiment utilizes the user database 150 to give the verification window. One possible modification may separately provide a database that stores print jobs and verification information mapped to the user ID of the job sender as a key. The information for identifying the job sender is not restricted to the user ID, but may be any piece of information for identifying a client that has sent each job, for example, an MAC address or an IP address.

B. SECOND EMBODIMENT

B1. General Construction of System

In the structure of the first embodiment, the instruction client 40 that gives the output instruction is different from the print station 30. A second embodiment regards a structure where a print station also functions as an instruction client.

Figure 6:
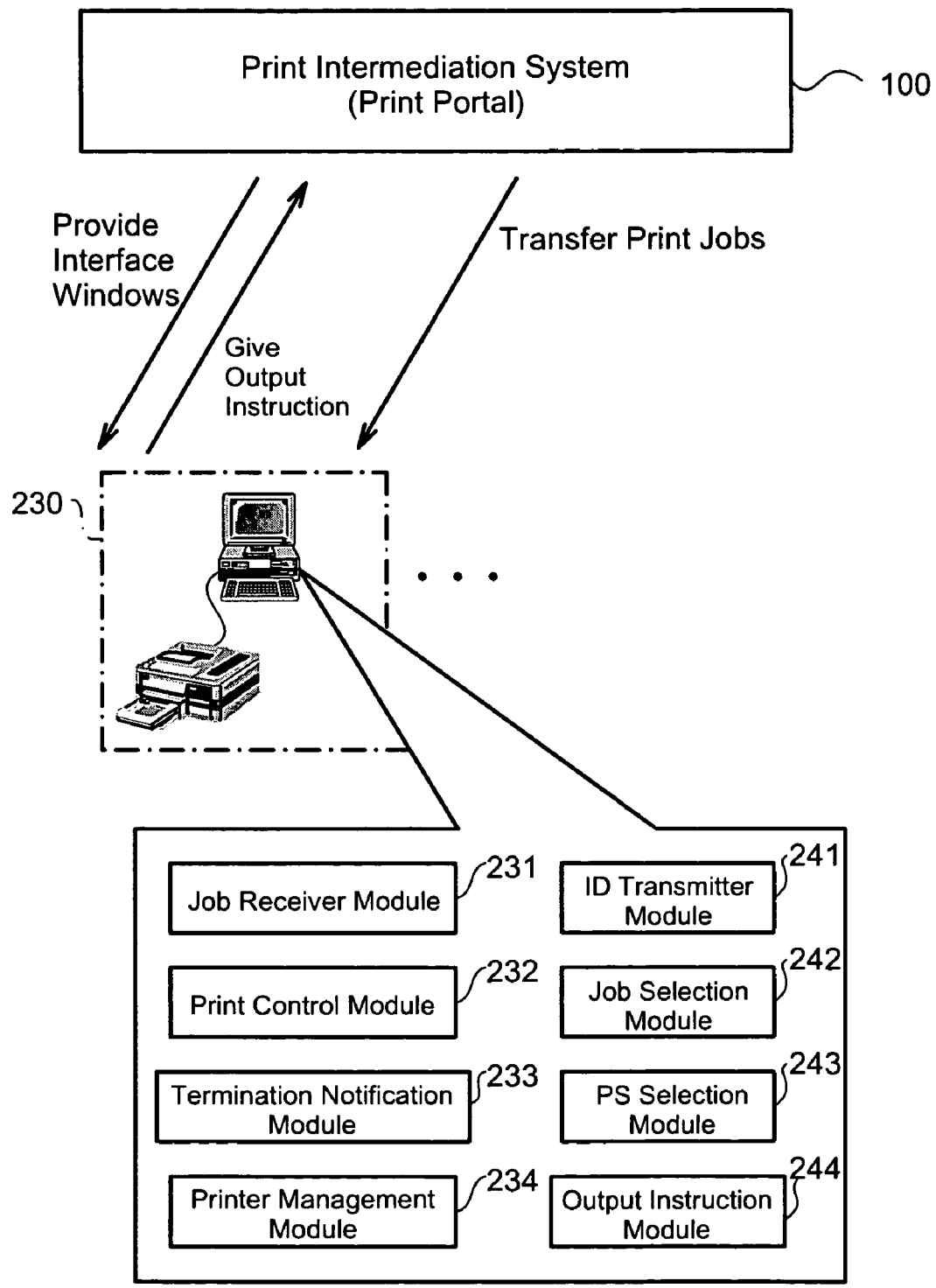
FIG. 6 illustrates the construction of a printing system in a second embodiment.

FIG. 6 schematically illustrates the construction of a printing system in the second embodiment. The job sender 10 and the content provider 20 are omitted from the illustration. In the structure of the second embodiment, a print station 230 sends an output instruction to the print portal 100. The print portal 100 transfers print jobs to the print station 230 to execute printing, in response to the output instruction.

The print station 230 includes a general purpose computer and a printer like the first embodiment. The print station 230 may alternatively be constructed by only a single printer having functions of access to the network. The print station 230 of the second embodiment has functional blocks to give an output instruction, in addition to functional blocks to execute printing.

The illustration includes the functional blocks included in the print station 230. A job receiver module 231, a print control module 232, a termination notification module 233, and a printer management module 234 are identical with the corresponding functional blocks of the first embodiment. An ID transmitter module 241, a job selection module 242, a PS selection module, and an output instruction module 244 are similar to the corresponding functional blocks included in the instruction client 40 of the first embodiment, with some functional differences discussed below. The PS selection module 243 sends self address information as information on a print station as an output destination, to the print portal 100. This arrangement ensures automatic execution of a selected print job without requiring a receiver who has sent the output instruction from the print station 230 to specify the output destination. The print station 230 may have a function of allowing the receiver to select another print station as the output destination, like the first embodiment.

The job selection module 242 functions to select transferred jobs like the first embodiment. The job selection module 242 of the second embodiment has an additional function of carrying out automatic output of selected print jobs. This function automatically executes printing of selected print jobs, for which the print station 230 has been set in advance as the output destination, among the print jobs managed by the print portal 100, whether or not the receiver selects the print jobs as transferred jobs. This arrangement ensures automatic execution of print jobs, which the sender desires the receiver to print, and iteratively delivered print jobs, thus enhancing the convenience of the printing system.

B2. Output Process

Figure 7:
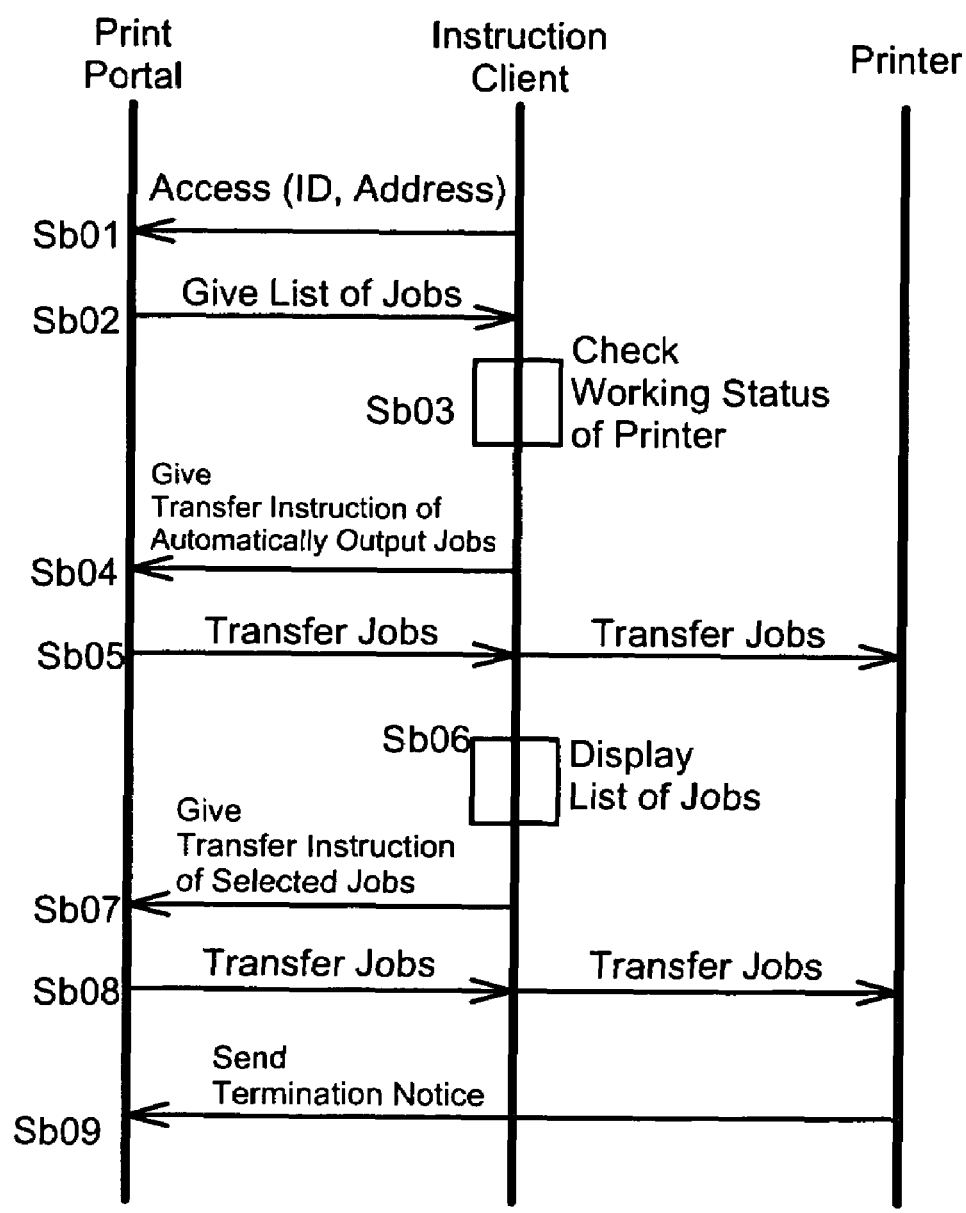
FIG. 7 is a flowchart showing an output process routine in the second embodiment.

FIG. 7 is a flowchart showing an output processing routine executed in the second embodiment. This flowchart omits the print job transmission phase and shows only the output phase. In the structure of the second embodiment, the print station 230 transmits information to and from the print portal 100. The flowchart shows the computer included in the print station 230 as the instruction client separately from the printer, so as to clarify information transmission inside the print station 230.

In the process of outputting a print job, the receiver gains access from the instruction client to the print portal 100 (step Sb01). At this stage, the instruction client transfers the user ID of the receiver and the address information of the print station 230 to the print portal 100. The print portal 100 gives a list of print jobs mapped to the received user ID to the instruction client (step Sb02).

The instruction client then checks the working status of the printer and determines whether the printer is in a printable state (step Sb03). The process does not carry out subsequent processing when the printer is in an unprintable state, for example, due to a power-off status or shortage of ink. In such cases, the process preferably gives a display representing the unprintable status to, for example, a display of the computer.

When the printer is in the printable state, on the other hand, the instruction client retrieves the list of print jobs to find any print jobs for which the print station 230 has been set in advance to the output destination. In the presence of such print jobs, the instruction client specifies these print jobs as automatically output jobs and gives a transfer instruction with regard to the automatically output jobs to the print portal 100 (step Sb04). The detection of the automatically output jobs may not be based on the setting of the output destination. One modified procedure may attach a flag representing execution or non-execution of automatic output to each print job. When the print portal 100 transfers the corresponding print jobs in response to the transfer instruction (step Sb05), the instruction client sends the transferred print jobs to the printer for execution of printing. The arrangement of the second embodiment ensures execution of printing of the automatically output jobs without displaying a list of such jobs.

When there are other print jobs, the instruction client displays a list of the other print jobs (step Sb06). When the receiver selects print jobs to be transferred, the instruction client transmits a transfer instruction of the selected print jobs to the print portal 100 (step Sb07). The print portal 100 transfers the selected print jobs in response to the transfer instruction via the instruction client to the printer for execution of printing (step Sb08). On completion of printing, the printer transmits a termination notice to the print portal 100 via the instruction client (step Sb09). It is preferable that the process also transmits a similar termination notice on completion of the automatically output jobs. The termination notice may be transferred to the job sender.

Figure 8:
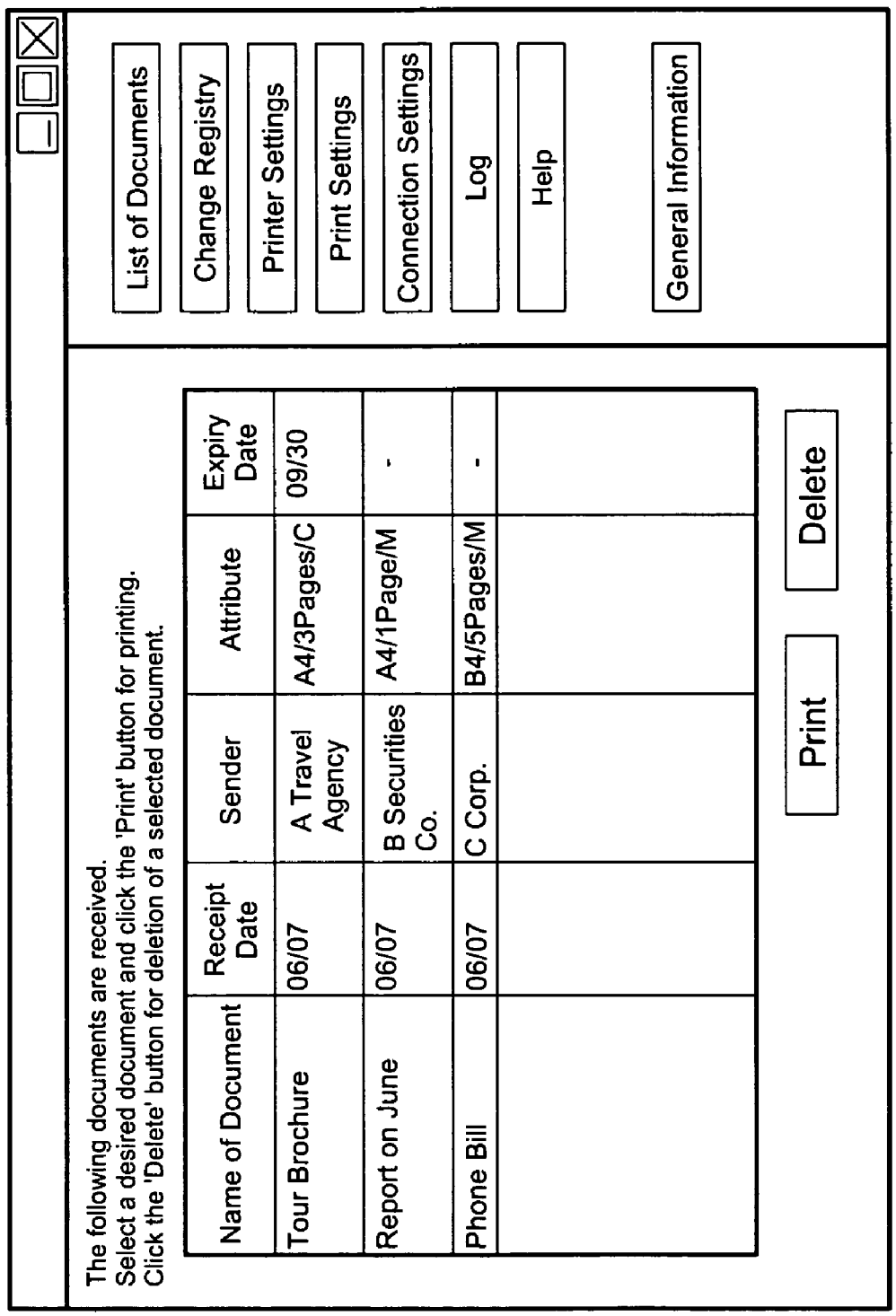
FIG. 8 shows an interface utilized to give an output instruction in the second embodiment.

FIG. 8 shows an interface used to give an output instruction in the second embodiment. The illustration shows a window displayed on the computer of the print station 230. The window includes a list of print jobs relating to the receiver. In this example, there are three print jobs including a tour brochure. The receiver selects one or multiple jobs to be printed and clicks a 'Print' button on the bottom of the window to execute printing. A 'Printer Settings' button and other buttons on the right column of the window are used for detailed settings with regard to printing and management of the printer.

As described above, the printing system of the second embodiment enables the receiver to specify the execution timing and the output destination of selected print jobs, like the printing system of the first embodiment. This arrangement desirably enhances the convenience of printing via the network. In the structure of the second embodiment, the print station itself is set to the output destination. This arrangement preferably simplifies specification of the output destination.

The automatically output jobs discussed in the second embodiment may be treated in a similar way in the structure of the first embodiment. In the system of the first embodiment, the instruction client 40 is different from the print station 30. One possible modification of the first embodiment may immediately transfer print jobs, for which the output destination has been set in advance, to the print station 30 without waiting for specification of transferred jobs, when the instruction client 40 gains access. In either of the first embodiment and the second embodiment, when the print portal 100 detects the active state of the print station 30 or 230, print jobs may be transferred immediately without waiting for an access from the instruction client. The job output status verification process (see FIG. 5) is also applicable to the structure of the second embodiment.

The embodiments and their modifications discussed above are to be considered in all aspects as illustrative and not restrictive. There may be many other modifications, changes, and alterations without departing from the scope or spirit of the main characteristics of the present invention. For example, the control processes discussed above may be actualized by the hardware construction, instead of the software configuration. The above embodiments regard the printing systems. The technique of the present invention may also be constructed as systems that display images and documents and that output audio data via the network.

INDUSTRIAL APPLICABILITY

The technique of the present invention is applicable to output of video and audio data via a network.

What is claimed is:

1. An intermediation server that is located on a network and transfers a job received via the network to an output device connecting with the network, said intermediation server comprising:
   a memory device for storing the received job;
   a job management module stored in memory as program instructions for execution, the job management module including program instructions for storing the received job into the memory device mapping to a user and managing jobs in the memory device grouped by respective users;
   an instruction input module stored in memory as program instructions for execution, the instruction input module including program instructions for receiving via the network an output instruction of corresponding jobs input remotely; and
   a job transfer module stored in memory as program instructions for execution, the job transfer module including program instructions for retrieving the corresponding jobs mapped to a specific user from the memory device and transferring at least part of the retrieved corresponding jobs to the output device, in response to the output instruction;
   wherein the plurality of the output devices are located on the network, and one of the plural output devices has been mapped in advance to the at least part of the corresponding jobs, as a transfer destination of the at least part of the corresponding jobs.

2. An intermediation server in accordance with claim 1, wherein said instruction input module comprises:
   a list presentation sub-module that includes program instructions for giving a list of the corresponding jobs to a sender of the output instruction; and
   a selection result input sub-module that includes program instructions for receiving a result of selection of a transferred job, which is to be transferred to the output device, from the list.

3. An intermediation server in accordance with claim 1, wherein said instruction input module receives the output instruction from one of the plural output devices; and said job transfer module transfers the at least part of the corresponding jobs to a sender of the output instruction.

4. An intermediation server in accordance with claim 1, wherein the output instruction includes transfer destination information, which is used to identify a transfer destination of the at least of the corresponding jobs, and
said job transfer module transfer the at least part of the corresponding jobs, based on the transfer destination information.

5. An intermediation server in accordance with claim 4, said intermediation server further comprising:
an authentication module stored in memory as program instructions for execution, the authentication module including program instructions for determining whether the specified user has right to use an output device identified by the transfer destination information,
wherein said job transfer module effectuates the transfer when the right of the specified user is authenticated.

6. An intermediation server in accordance with claim 1, wherein said job management module notifies each user of receipt of corresponding jobs, which are mapped to the user.

7. An intermediation server in accordance with claim 1, wherein said job management module manages sender information, which is used to identify a sender of each job and has been mapped to the job,
said intermediation server further comprising:
a request input module stored in memory as program instructions for execution, the request input module including program instructions for receiving the sender information and a verification request of an output result of each job from one of clients connecting with the network; and
an output result presentation module stored in memory as program instructions for execution, the output result presentation module including program instruction for extracting a job mapped to the sender information from said job management module, in response to the verification request, and presenting a result of the extraction to the client.

8. An intermediation server in accordance with claim 7, wherein said job management module manages at least identification information on each job of completed output, which is mapped to the sender information, and
said output result presentation module presents the result of the extraction including the job of completed output.

9. An intermediation method for transferring a job received via a network to an output device connecting with the network, said intermediation method comprising:
storing a received job into a memory device mapping to a specific user;
providing an intermediation server that manages jobs in the memory device grouped by the specific users;
receiving via the network an output instruction of corresponding jobs input remotely;
retrieving the corresponding jobs mapped to the specific user from the memory device;
transferring at least part of the retrieved corresponding jobs to the output device, in response to the output instruction;
sending identification information, which is used to identify the specific user, to said intermediation server;
selecting said job to be transferred among jobs managed corresponding to the specific user; and
wherein the plurality of the output devices are located on the network, and one of the plural output devices has been mapped in advance to the at least part of the corresponding jobs, as a transfer destination of the at least part of the corresponding jobs.

10. A computer readable recording medium, in which a computer program is recorded, said computer program when executed by a processor activating an intermediation server located on a network to transfer a job received via the network to an output device connecting with the network, said computer program causing said intermediation server to attain:
a function of managing jobs grouped by specified users;
a function of receiving via the network an output instruction of corresponding jobs, which are mapped to a specified user;
a function of transferring at least part of the corresponding jobs to the output device, in response to the output instruction;
a function of sending identification information, which is used to identify the specified user, to said intermediation server;
wherein the function of transferring includes giving an instruction of transferring at least one job selected among jobs managed corresponding to the specified user;
an output instruction device located on the network to send an instruction to the intermediate server is constructed as the output device; and
the function of transferring does not require any operation of the specified user to give the instruction of transferring with regard to the job, for which said output instruction device itself has been set in advance as a transfer destination in said intermediation server.

11. A computer readable recording medium in accordance with claim 10, wherein said computer program further causes said output instruction device to attain:
a function of sending transfer destination information, which is used to identify a transfer destination.

12. A computer readable recording medium in accordance with claim 11, wherein the transfer destination information is used to identify said output instruction device on the network.

13. A computer readable recording medium in accordance with claim 10, wherein said computer program further causes said output instruction device to attain:
a function of sending a selection result representing a job to be transferred, which is selected by the specified user among the jobs managed corresponding to the specified user, to said intermediation server.

* * * * *